Oct. 5, 1954 — G. H. SCHANZ — 2,690,592
METHOD OF AND APPARATUS FOR EXTRUDING TUBING
Filed April 27, 1951 — 2 Sheets-Sheet 1

Inventor
George H. Schanz
By T. T. Brucker
Atty.

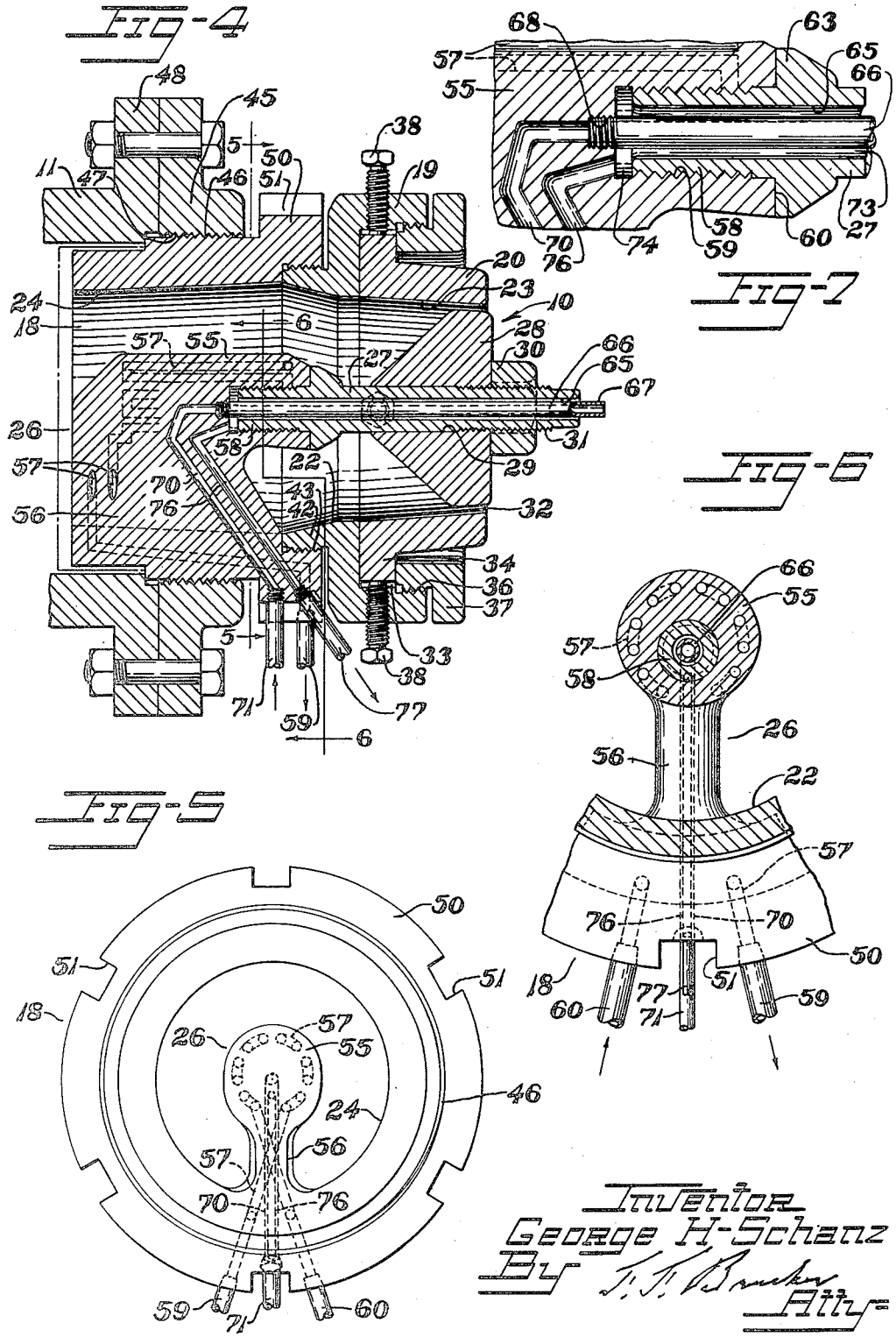

Patented Oct. 5, 1954

2,690,592

UNITED STATES PATENT OFFICE 2,690,592

METHOD OF AND APPARATUS FOR EXTRUDING TUBING

George H. Schanz, Akron, Ohio, assignor to The B. F. Goodrich Company, New York, N. Y., a corporation of New York Application April 27, 1951, Serial No. 223,229

7 Claims. (Cl. 18—14)

This invention relates to the extrusion of plastic material and more especially to the extrusion of tubular articles of flexible plastic materials such as rubber and rubber-like compositions.

In the manufacture of a tubular article of a plastic such as rubber or the like it has been proposed to coat the interior surface of the tubing with adhesion-resistant material to prevent the sides of the tubing from sticking together before the tubing has been vulcanized. The coating may be a liquid such as a water-soluble oil, wax, etc. or it may be a finely divided material such as powdered soapstone, or the like. The coating material has been usually dispersed in a fluid medium such as air and then this mixture has been introduced into the tubing as the tubing is progressively shaped. The coating material in the medium adheres to the warm, tacky plastic to form a suitable coating inside the tube.

Tubing for producing articles such as inflatable tubes for pneumatic tires has been coated in the above-described manner as the tubing is continuously extruded onto conveying means on which the tubing is carried to successive processing stations where it may be cooled, marked, cut to required lengths, etc. It has been found that the fluid medium used as a carrier for the coating material does not readily escape before the tubing reaches the processing stations. In some cases the medium has produced a billowing or ballooning effect which has interfered with the succeeding processing operations and it has inflated the tubing to such an extent that the tubing has become distorted and the wall appreciably stretched and weakened. This effect has been particularly troublesome in connection with the manufacture of relative thin gauge tubing.

It is an object of this invention to apply coating to the tubing in such a manner as to avoid excessive inflation or ballooning so that the tubing may be substantially collapsed and flattened when it reaches the processing stations.

Another object is to introduce a dispersion of coating material into the tubing and to withdraw or remove from the tubing a proportion of the atmosphere contained in the tubing to collapse or flatten the tubing.

A further object is to provide apparatus including tube-shaping means through which the coating is introduced into the tubing and through which atmosphere in the tubing such as excess coating material, etc. is withdrawn from the tubing, suitable equipment for supplying coating material to the tube-shaping means, and equipment for removing the atmosphere, etc. in the tubing to effect the flattening of the tubing.

These and other objects of the invention will appear from the following description and accompanying drawings in which:

Fig. 4 is a longitudinal section taken through the tube-shaping structure;

Fig. 5 is a rear view of the extruding head member of the tube-shaping structure taken from a position indicated by the line 5—5 of Fig. 4;

Fig. 6 is a view partially in cross-section taken on the line 6—6 of Fig. 4; and Fig. 7 is a view on an enlarged scale of a portion of Fig. 4.

Figure 1:
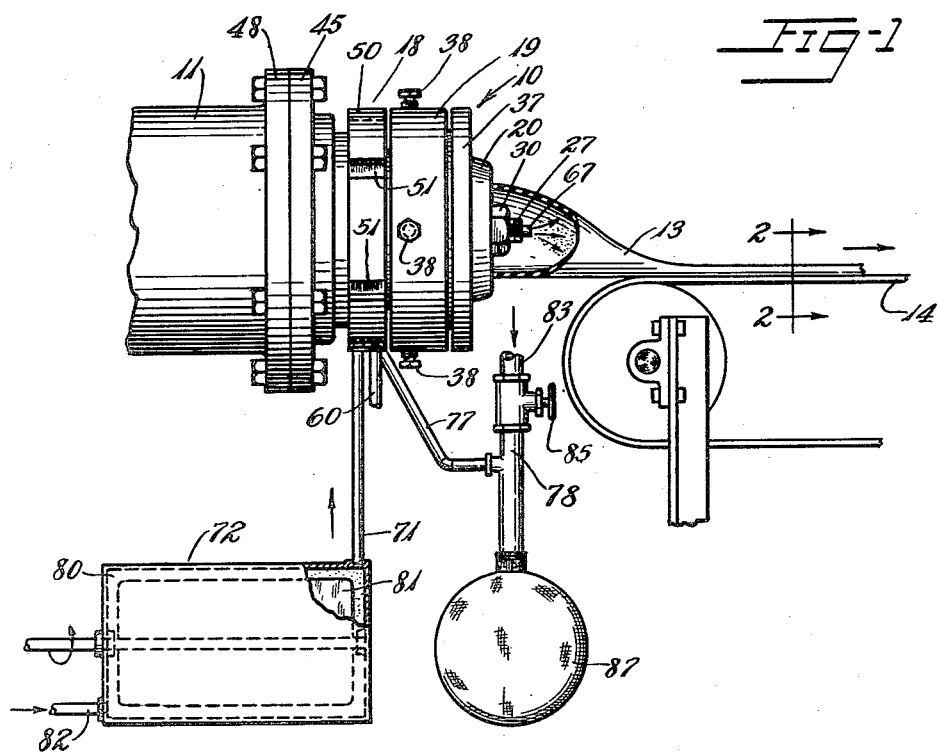
Fig. 1 is a side elevation showing the general arrangement of apparatus constructed according to and embodying the invention.

In the apparatus shown in Fig. 1, a tube-shaping structure 10 is mounted on the discharge end of a barrel or cylinder 11 of an extrusion machine. The cylinder surrounds suitable pressure means (not shown) such as a screw or the like which is operable to force raw plastic toward the cylinder's discharge end and through the element 10 which shapes the plastic into tubing 13. As fast as the tubing emerges from the element 10 it is received by a conveyor 14 and carried to various stations for further processing.

Details of the tube-shaping structure 10 are shown in Fig. 4. This structure includes an extruding head 18 which supports an annular retaining ring 19 in which a die 20 is adjustably mounted. The retaining ring 19 has an axial bore 22 which is substantially in register with a bore 23 through the die at one side of the ring and which is also substantially in register with an axial opening 24 through the head 18 at the other side of the ring to form a channel through the assembly through which plastic from the extrusion machine is adapted to flow. In the opening 24 through the head 18 there is a spider 26 for supporting a hollow arbor 27 which extends axially through the bore 22 of the retaining ring and supports a removable mandrel 28 inside the bore 23 of the die. The mandrel has an axial opening 29 through which the arbor fits and the mandrel is retained on the arbor by a nut 30 which is threaded onto a thread 31 formed around the end of the arbor. The arbor supports the mandrel out of contact with the bore of the die so that between the die and the mandrel there is an orifice 32 through which plastic is forced to form the plastic into a tube, the bore of the die shaping the exterior surface of the tubing and the mandrel shaping the bore of the tubing. The mandrel and die may be appropriately designed to produce tubing of any required cross-sectional shape.

In order to support the die 20 the retaining ring 19 is formed with a relatively deep counterbore 33 at one side to receive an annular base portion 34 at the bottom of the die 20. To secure the die in the counterbore an annular ring-nut 37 is screwed into a thread 36 formed in the counterbore 33 and tightened against the base 34 of the die. The diameter of the die base 34 is less than the diameter of the counterbore 33 and to provide lateral support for the base in the counterbore there are several die-adjusting screws 38 which are threaded radially through the wall surrounding the counterbore 33 and which bear against the peripheral edge of base 34. By changing the adjustment of screws 38 the die may be moved laterally in the counterbore relative to the mandrel 28 to change the shape of the orifice 32 between the mandrel and the die.

The retaining ring 19 is supported by an annular collar 42 located on the back of the retaining ring which is threaded into a counterbore 43 in the front end of the extruding head 18. The opposite end of head 18 is substantially cylindrical so that this end of the head fits through an annular collar 45 and into the cylinder 11 of the extrusion machine. The head 18 is formed with an external thread 46 which is screwed into a corresponding internal thread 47 inside collar 45 and to fasten the head 18 in cylinder 11 the collar 45 is bolted to an outwardly projecting flange 48 around the end of cylinder 11. The front end of the head 18 into which the collar 42 is threaded is provided with an outwardly projecting flange 50 having a number of rectangular-shaped notches 51 extending inwardly from the peripheral edge of the flange at equally spaced intervals so that a spanner wrench or the like may be engaged with the flange to screw the head into and out of collar 45.

According to this invention a fluid medium containing a dispersion of the coating material is blown into the tubing as the tubing is extruded and then a proportion of the atmosphere is withdrawn or removed so that ballooning of the tube is avoided and desirably the tubing is collapsed and flattened. To accomplish these operations the spider 26 and arbor 27 are designed with hollow portions in communication with the interior of the tubing as it is shaped and through these portions there is a counterflow of dispersed coating material, etc., into and out of the tubing when the apparatus is in operation.

The spider 26 is advantageously formed integrally with the extruding head so that the arbor and mandrel are rigidly supported as the plastic is forced around them through the head and the retaining ring to the orifice 32. The spider has a relatively thick hub portion 55 (see Figs. 5 and 6) which is about as long as the head and is located in about the axial center of the head 18. This hub portion 55 is connected to the wall of the head by a web portion 56 which is relatively thin so that the web presents a minimum resistance to the flow of plastic through the head. The sides of the web 56 are curved inwardly adjacent each end of the web to provide a streamlined shape around which the plastic will readily flow. The surface of the web, the hub portion 55 and the opening 24 through the head are smooth to facilitate the flow of plastic through the head. A spider of the preferred design requires less power to force plastic through it than spiders of the type in which more than one web is used to support the hub.

The hub 55 of the spider is relatively thick and is honeycombed by a passage 57 through which a thermal medium such as water, etc. is circulated to cool the spider during an extrusion operation. Each end of the passage 57 terminates on the peripheral surface of the flange 50 on the head 18 (see Fig. 5) and the conduits 59 and 60 are connected to the passage and are adapted, respectively, to supply and to drain the thermal medium.

The arbor 27 which supports the mandrel in the die is connected to the hub 55 by a threaded shank 58 (see Fig. 7) on the inner end of the arbor which fits into a threaded hole 59 which extends axially into the hub from a flat, vertical face 60 at the front end of the hub. The portion of the arbor immediately above the shank 58 is formed with an outwardly flaring skirt 63 which fits flat against face 60 on the hub when the shank is fastened tightly in the hole 59 in order to strengthen the arbor against bending stresses which will be at a maximum at this point on the arbor. Through the center of the arbor 27 there is an axially extending opening 65 which surrounds a narrow tube 66, the outer end of which projects beyond the front end of the arbor at numeral 67 (see Fig. 4) and the inner end of which is screwed into a hole 68 formed in the center of the bottom of the hole 59 in the hub. Hole 68 is the terminus of a passage 70 inside the hub 55 which passage 70 extends downwardly through the web portion into the flange 50, where it is connected to a conduit 71 (see Figs. 1 and 4) from a coating-material supply unit 72. The coating material is conducted through the passage 70 to the tube 66 through which it passes and then is introduced into the tubing.

The opening 65 through the arbor is wider than the tube 66 so that it forms an annular channel 73 concentrically around tube 66. This channel 73 communicates with an annular recess 74 around the tube between the end of shank 58 on the arbor and the bottom of hole 59 since this hole is deeper than the length of the shank as shown in Fig. 7. Extending from this recess 74 through the web to the flange 50 is a second passage 76 to which a conduit 77 is connected at the flange 50. This conduit leads to an ejector valve 78 and, as will be subsequently explained, the atmosphere contained in the tubing is withdrawn therefrom through the channel 73, the recess 74, and the passage 76 by the action of the ejector 78 to collapse the tubing. The terminus of passage 76 at the recess 74 is preferably at the bottom of the recess to prevent coating material from accumulating in recess 74.

In the operation of the apparatus coating material is blown by unit 72 (see Fig. 1) through the conduit 71 where it is introduced into the passage 70 in the spider. Passage 70 conducts the material through the spider to the tube 66 through which it is carried into the interior of the tubing 13 as the tubing is formed at the orifice 32. Arrows are shown in Figs. 1 and 4 to indicate the direction of flow for the coating material.

Figure 2:
Fig. 2 is a cross-sectional view on an enlarged scale of the tubing in its relaxed or collapsed state taken on the line 2—2 of Fig. 1.
Figure 3:
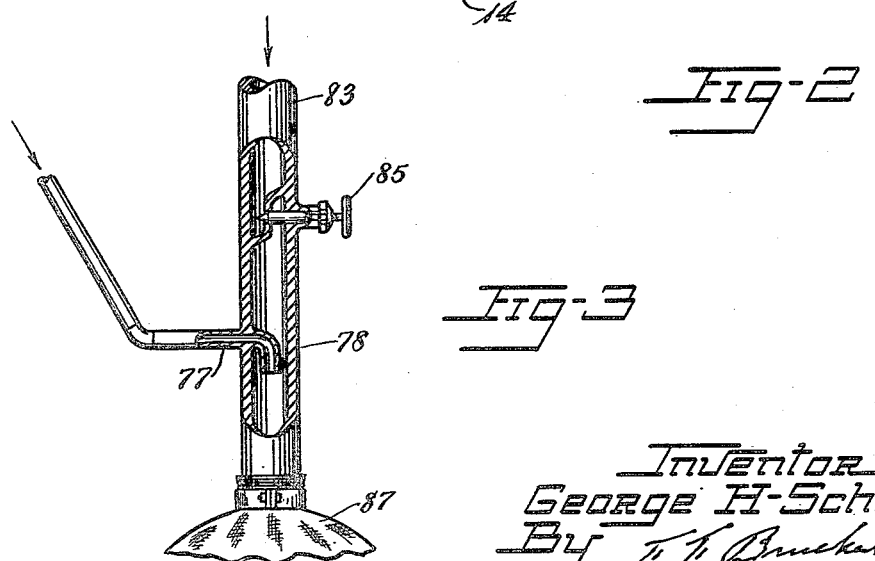
Fig. 3 is a view showing the details of an ejector.

An appreciable proportion of the coating material blown into the tubing 13 adheres to the surface to form a coating on the tube. The coating material not so adhering together with the carrier medium and air, etc. inside the tubing is withdrawn by the action of the ejector valve 78. This atmosphere in the tubing is sucked by the ejector valve into the concentric channel 73 and then into the recess 74 where it is emptied into passage 76 which conducts it through the spider into conduit 74 and the ejector valve. The operation is such that the carrier medium is withdrawn substantially as fast as it is injected so that the tubing 13 is collapsed substantially as shown in Fig. 2. A major proportion of the atmosphere in the tubing is removed and ordinarily some air etc. will remain along the marginal folds 79 but this small amount will not be sufficient to interfere with further processing operations, and may be desirable to avoid objectionable creasing at the folds.

The "atmosphere" withdrawn from the tubing includes air, etc. normally in the tubing, the fluid medium employed as a carrier for the coating material, and any excess coating material which does not adhere to the walls of the tubing.

The coating-material supply unit 72 as indicated in Fig. 1 may be any of the suitable known devices for this purpose. The unit illustrated is suitable for a dry, powdered coating material and includes a tank 80 which contains the powdered material which is agitated by rotation of the paddles 81. A carrier medium such as compressed air is blown into the bottom of the tank at 82 so that the coating material is dispersed in the medium and blown into the conduit 71. Suitable means for performing this operation with liquid coating material may be used if desired.

Any suitable ejector valve may be used. The preferred ejector valve 78 is operated by air pressure supplied through a conduit 83 and the flow of the air is controlled manually by a needle valve 85 so that the desired reduction in pressure may be obtained at the end of conduit 77. As mentioned above the quantity of atmosphere withdrawn from the tubing may be varied as desired and the ejector will be installed at a location where an operator can conveniently adjust the needle valve to obtain the desired operating conditions so that the tubing will become flattened to the degree it is desired to obtain.

When dry powdered coating material is used, the atmosphere withdrawn from the tubing by the ejector may be exhausted into a suitable receiver such as a fabric bag 87 which is sufficiently porous to permit the carrier medium to escape but which filters out the excess coating material in the exhaust so that this material may be reused. If liquid coating material is used a suitable receiver for liquid may be provided or the ejector may be exhausted into a drain.

Variations may be made without departing from the scope of the invention as it is defined in the following claims.

I claim:

1. Apparatus for extruding plastic material to provide a tubular article, which apparatus comprises tube-shaping means including a die for shaping the exterior surface of the article and bore-shaping means for forming the interior of the article, a first passage in the bore-shaping means adapted to be in communication with the interior of the article as it is progressively formed, pressure means for introducing into the article through said passage adhesive-resistant material to progressively coat the interior surface of the article, a second passage located concentrically of the first passage in the bore-shaping means adapted to be in communication with the interior of the article as it is formed, and suction means connected with the second passage and operable to withdraw from the article through said passage a proportion of the atmosphere and including the excess coating material contained therein.

2. Apparatus for extruding plastic material to provide a tubular article, which apparatus comprises an extrusion machine for discharging plastic from one end thereof, a die for shaping the exterior surface of the article, means for supporting the die at the discharge end of the extrusion machine through which means the plastic is adapted to flow toward the die, and in the die-supporting means a spider located in the path of the plastic flowing therethrough, a mandrel positioned within the die around which the plastic is adapted to flow whereby the interior surface of the article is shaped, mandrel-supporting means projecting from the spider, and extending through the mandrel-supporting means and through the spider two passages, each of which is adapted to be in communication with the interior of the article as it is progressively formed, means for progressively supplying adhesion-resistant, tube-coating material to one of the passages through which it is conducted into the interior of the article, and means connected to the other passage for progressively withdrawing therethrough a proportion of the atmosphere contained in the article.

3. Apparatus for extruding flexible plastic material to provide a tubular article, which apparatus comprises tube-shaping means including a die for shaping the exterior surface of the article and a mandrel for shaping the interior of the article, means for supporting the die in spaced relation to the mandrel, and in the die-supporting means a spider, an arbor extending from the spider to support the mandrel in the die, an opening extending axially through the arbor, a tube narrower than said opening positioned in the opening and connected to the spider, in the spider two passages, one of which communicates with the opening through the arbor, and the other of which communicates with the tube extending through the arbor, means for introducing adhesion-resistant, tube-coating material into one of the passages through which it is conducted to article as the article is progressively shaped, and ejector means connected with the other passage to progressively withdraw the atmosphere contained in the article to substantially collapse the article as it is progressively formed.

4. The method of extruding rubbery material to form flexible relatively thin-walled rubber tubing, which method includes the step of collapsing the tubing as it emerges from the extruder by sucking from the tubing as it is extruded a major proportion of the atmosphere contained inside it until two opposite wall portions of the tubing are in contact with each other but with atmosphere remaining in marginal portions of the tubing bordering said contacting wall portions to prevent the marginal wall portions of the tubing from being creased.

5. The method of making a flexible, tubular, plastic article which comprises extruding plastic material into a tube, introducing into the interior of the tube as it is progressively extruded a fluid medium containing adhesion-resistant material dispersed therein adapted to adhere to the interior surface of the tube, and, simultaneously with the last said step, progressively collapsing the tube substantially as it is extruded by sucking from the major proportion of the atmosphere contained inside it.

6. Apparatus for extruding plastic material to provide a tubular article, said apparatus comprising tube-shaping means including a die for forming the exterior of a tube and bore-shaping means having a peripheral surface spaced inwardly from said die for forming the interior of the tube and an outer face directed away from the die in the direction in which the tube is formed and transversely intersecting said peripheral surface, the outer face and the peripheral surface merging at a corner which shapes the final internal dimensions of the tube, a suction passage extending through the bore-shaping means and communicating with said outer face, and suction means connected with said passage and adapted to withdraw from the tubing through said passage a proportion of the atmosphere contained therein as the tubing is progressively extruded.

7. Apparatus for extruding plastic material to provide a tubular article, said apparatus comprising tube-shaping means including a die for forming the exterior of a tube and bore-shaping means having a peripheral surface spaced inwardly from said die for forming the interior of the tube and an outer face directed away from the die in the direction in which the tube is formed and transversely intersecting said peripheral surface, the outer face and the peripheral surface merging at a corner which shapes the final internal dimensions of the tube, means for introducing an adhesion-resistant coating material into the article, a suction passage extending through the bore-shaping means and communicating with said outer face of the bore-shaping means, and suction means connected with the passage and operable to withdraw from the tube through said passage a proportion of the atmosphere contained in the article as the tube is progressively extruded.

References Cited in the file of this patent

UNITED STATES PATENTS

| Number | Name | Date |
|---|---|---|
| 1,133,610 | Bleecker | Mar. 30, 1915 |
| 1,163,740 | Cohoe | Dec. 14, 1915 |
| 1,544,255 | Maynard | June 30, 1925 |
| 1,730,638 | Young | Oct. 8, 1929 |
| 1,740,029 | Moomy | Dec. 17, 1929 |
| 2,317,687 | Larchar | Apr. 27, 1943 |
| 2,461,976 | Schenk | Feb. 15, 1949 |